Jan. 8, 1929.
A. D. MAURY
REEL SEAT LOCK
Filed June 30, 1926
1,698,341
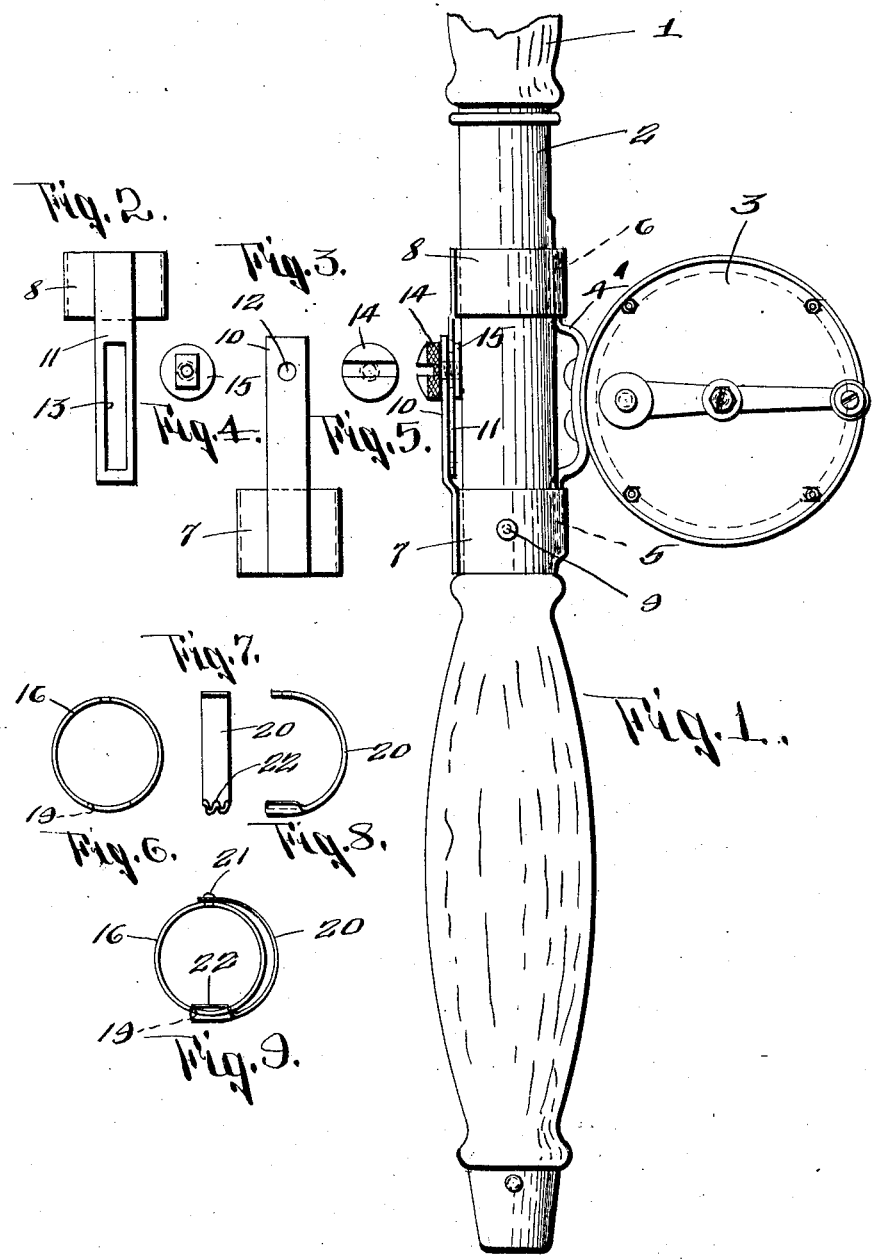
INVENTOR.
Alfred D. Maury,
BY
Parsons & Rodell
ATTORNEYS.

Patented Jan. 8, 1929.

1,698,341

UNITED STATES PATENT OFFICE.

ALFRED D. MAURY, OF ILION, NEW YORK, ASSIGNOR TO MARTIN AUTOMATIC FISHING REEL COMPANY, INC., OF MOHAWK, NEW YORK, A CORPORATION OF NEW YORK.

REEL SEAT LOCK.

Application filed June 30, 1926. Serial No. 119,721.

This invention relates to fishing tackle and particularly to means for locking the reel on the fish pole, so that it cannot become unintentionally detached particularly when casting, which locking means is particularly simple and economical in construction, readily applied to the reel and the pole, and is highly efficient and durable in use.

The invention consists in the novel features and in the combinations and constructions hereinafter set forth and claimed.

In describing this invention reference is had to the accompanying drawings in which like characters represent corresponding parts in all the views.

Figure 1 is a fragmentary elevation of a fish pole and reel provided with my invention.

Figures 2 and 3 are detail views of the preferred form of the means for locking the reel in position.

Figures 4 and 5 are detail views of the fastening means of said locking means.

Figure 6 is a detail view of another form of locking ring.

Figures 7 and 8 are detail views taken at an angle to each other of a locking member used with the ring shown in Figure 7.

Figure 9 is a view of the ring and locking means shown in Figures 6, 7 and 8.

As will be understood by those skilled in the art, the reel during casting operations becomes detached owing to the violence of the throw, and such detaching of the reel is a source of great annoyance.

This invention comprises rings enclosing the shank of the fish pole, and the feet on the base of the reel, one of these rings being usually stationary and one foot of the reel inserted under it, while the other ring is slidable or shiftable axially of the shank of the pole into and out of engagement with the other foot of the reel, and means for holding the shiftable ring from axial movement so that during the casting operation the ring cannot slip off from the foot of the reel.

1 designates the pole having the usual shank or reel support 2.

3 is a reel having a base provided with laterally extending feet 5 and 6 designed to seat on the shank 2.

7 and 8 are respectively the rings coacting with the feet 5 and 6, the ring 7 being permanently secured to the shank as by a member 9 and the ring 8 being shiftable axially.

Preferably each ring is formed with an arm 10 or 11 extending lengthwise of the shank 2, the arm 10 of the ring 7 and the arm 11 of the ring 8 lapping each other and the arm 10 being formed with a perforation 12, the arm 11 with the slot 13. These arms are secured together by a screw 14, which extends through the slot 13 and perforation 12 and threads into a nut 15 on the underside of the arm 10, and overlying the periphery of the shank 2 so that the nut is located and held between the shank and the arm 10. Obviously after the ring 8 has been slipped over the foot 6 of the reel, and the screw 14 tightened the ring 8 is positively held from any shifting and the reel held from becoming detached.

In Figures 6, 7, 8 and 9 another form of locking means is shown in which the ring 16 corresponding to the ring 8 is formed with a slot 19 exposing a roughened surface on the shank 2, and a spring clip 20 is secured to the ring 16 at 21 and has an engaging end 22 extending through the slot 19 to coact with the roughened surface of the shank 2.

Obviously in the form shown in Figures 6, 7 and 8 the shiftable ring 16 is held positively locked from any shifting movement.

What I claim is:—

1. The combination with a fish pole having a shank, and a reel having feet for engaging the shank, of means for securing the reel to the shank, including rings encircling the shank and said feet, one ring being shiftable axially, means in addition to the shank connecting the rings for holding the shiftable ring from shifting movement on the shank.

2. The combination with a fish pole having a shank and a reel having feet for engaging the shank, of means for securing the reel to the shank, including rings encircling the shank and said feet, one ring being shiftable axially, arms extending from the rings and lapping each other, and means for securing the arms together.

3. The combination with a fish pole having a shank, and a reel having feet for engaging the shank, of means for securing the reel to the shank, including rings encircling the shank and said feet, one ring being shiftable axially, arms extending from the rings and lapping each other, one arm being formed with a slot and a screw extending through the slot and into the other arm.

In testimony whereof, I have hereunto signed my name, at Ilion, in the county of Herkimer and in the State of New York, this 8th day of June, 1926.

ALFRED D. MAURY.